United States Patent [19]

Boudry et al.

[11] Patent Number: 5,305,453

[45] Date of Patent: Apr. 19, 1994

[54] PROCESS AND DEVICE FOR ADJUSTING CLOCK SIGNALS IN A SYNCHRONOUS SYSTEM

[75] Inventors: Jean-Marie Boudry, Maurepas; Jacques Brinkuysen, Guyancourt, both of France

[73] Assignee: Bull S.A., Paris, France

[21] Appl. No.: 750,967

[22] Filed: Aug. 28, 1991

[30] Foreign Application Priority Data

Aug. 30, 1990 [FR] France .................. 90 10805

[51] Int. Cl.$^5$ ............................................ G06F 13/00
[52] U.S. Cl. .................................................. 395/550
[58] Field of Search ............... 395/550; 307/260, 269, 307/262, 264, 590, 591

[56] References Cited

U.S. PATENT DOCUMENTS

| | | | |
|---|---|---|---|
| 3,737,683 | 6/1973 | Sangster | 307/591 |
| 3,809,884 | 5/1974 | Nibby et al. | 395/425 |
| 4,509,120 | 4/1985 | Daudelin | 395/550 |
| 4,593,379 | 6/1986 | Fourcade et al. | 395/550 |
| 4,989,175 | 2/1991 | Boris et al. | 395/550 |
| 5,028,824 | 7/1991 | Young | 307/603 |
| 5,030,861 | 7/1991 | Hoffmann et al. | 307/571 |
| 5,036,230 | 7/1991 | Bazes | 307/527 |
| 5,086,500 | 2/1992 | Greub | 395/550 |

FOREIGN PATENT DOCUMENTS

| | | |
|---|---|---|
| 0294505 | 4/1973 | European Pat. Off. . |
| 0366326 | 3/1982 | European Pat. Off. . |
| 8802532 | 5/1981 | Netherlands . |

Primary Examiner—Dale M. Shaw
Assistant Examiner—D. Dinm
Attorney, Agent, or Firm—Weingarten, Schurgin, Gagnebin & Hayes

[57] ABSTRACT

A process and apparatus for adjusting clock signals in a synchronous system of the type having several units synchronized by clock signals furnished by at least one generator providing a basic clock signal The generator includes means for adjusting the clock signals, the adjustment means being controlled by digital adjustment parameters.

15 Claims, 4 Drawing Sheets

PROCESS AND DEVICE FOR ADJUSTING CLOCK SIGNALS IN A SYNCHRONOUS SYSTEM

FIELD OF THE INVENTION

The invention applies to synchronous systems, in particular to the central subsystem of a data processing system.

BACKGROUND OF THE INVENTION

Data processing systems are composed of a plurality of functional units, generally in the form of integrated circuits distributed on electronic cards or printed circuit boards. These units (cards and/or integrated circuits) typically operate in synchronism under the control of clock signals supplied from a common-base clock.

By comparison with asynchronous systems, synchronous systems have an advantage in speed, as exchanges of information signals between the units are performed directly, bypassing resynchronization circuits which may introduce delays. Another advantage is the ability to freeze the system in a given logic state by stopping transmission of clock signals. Synchronous systems also simplify certain maintenance operations, such as reducing the frequency when defective electronic cards are replaced, as described in French Patent Application No. 88 16194 filed on Dec. 9, 1988, (U.S. patent application Ser. No. 07/444,941, filed Dec. 4, 1989); entitled "Système électronique à plusieurs unités amovibles" ("Electronic System with Several Detachable Units").

On the other hand, synchronous systems have the disadvantage of being difficult to implement, particularly when there is a large number of synchronous units. It is difficult to achieve fully synchronous operation of all the units while maintaining a high operating frequency. Links between units and technological variations in these units introduce spurious synchronization differences which make it necessary to reduce the operating frequency. These spurious phase shifts are both static ("skew") and dynamic ("jitter").

To overcome this drawback, the first approach is to eliminate the causes of phase shift due to the links by disposing the units as regularly as possible in the system. However, this solution does not make up for technological variations which may be very large, particularly if the integrated circuits come from different manufacturers.

Hence, it has been necessary to provide correction circuits that act on the characteristics of the transmitted signals. Of course, to resolve the synchronization problem, the clock signals must be corrected as the first priority. Generally, clock signals are generated by clock generators from a basic clock signal furnished for example by a quartz oscillator. The correction can be made to these generators by influencing the phases of the transmitted signals and in particular the amplitude (voltage or current) of these signals by adjusting the characteristics of the generator output amplifiers.

To determine the optimum corrections, the safest solution is to run each system on a test bench and search for the correction that produces an amplitude and phase match between the signals actually obtained and reference signals. These reference signals define characteristics imposed by the specifications of the system being designed. Also, in order to guard against problems linked to technological variations, it is preferable to choose a digital adjustment method whereby the adjustments to be made are defined by a binary number defining the adjustment value. To make the correction according to the adjustment value, discrete delay circuits and adjustable amplifiers are used.

As soon as the values of the adjustment parameters are determined on the test bench, they must be preserved for use in normal operation after the system has been initialized. Generally, systems of some size include maintenance devices composed essentially of a service processor, specific maintenance units, and maintenance circuits integrated into functional units. These elements are connected together by a set of links called a maintenance channel. The system is then started up under the control of the service processor which triggers initialization of the technological parameters controlling the various adjustment means provided in the clock generators. For this purpose, a nonvolatile memory belonging to the service processor (diskette or other auxiliary memory) in which the adjustment parameters are stored can be used. However, this solution has the drawback that replacement of certain system circuits may make it necessary to change the stored data. This is particularly true in the case of a changed clock generator. Thus, the goal of the invention is to propose a solution to overcome the above drawbacks.

SUMMARY OF THE INVENTION

The present invention is a process for adjusting clock signals in a synchronous system of the type having several units synchronized by clock signals furnished by at least one generator providing a basic clock signal. The generator includes means for adjusting the clock signals, the adjustment means being controlled by digital adjustment parameters.

According to the invention, before system startup there is a determination of the optimum value of adjustment parameters in accordance with reference characteristics of the clock signals. The optimum values are loaded into a nonvolatile memory associated with the generator. At system startup the memory is read. An adjustment means is controlled by the value read from said memory.

Various embodiments are provided for reading the memory. A service processor read interface can be used, providing the appropriate links and circuits. However, this method does not allow immediate verification of whether the adjustment is actually correct. In fact, errors may have been introduced either when the memory was written or when it was read. If this is the case, the system may operate incorrectly and materially impair system operation.

It should also be noted that the maintenance means generally provided in such a system has synchronous circuits, synchronized by the system clock, for making certain interventions in the functional units during operation. These synchronous circuits generally have read and write circuits as well as automatic devices allowing dynamic dialogues to be effected with the units, for example. Thus, in another embodiment, these synchronous circuits are used to read the nonvolatile memory. If the memory has not been read correctly, these synchronous circuits do not receive the right clock signals. The memory is read by a read circuit synchronized by the clock signals. Reading of the memory is accompanied by detection of the existence of read errors. In the absence of a read error the adjustment means are controlled directly by the value read into memory. In the case of a read error, the adjustment means are controlled by a modified value of the adjustment parameters. The first reading of the memory is preceded by a stage consisting of controlling the adjustment means by an approximate value of the adjustment parameters.

Read errors can be detected in various ways. In one embodiment an encryption method could be used, or a binary word with a particular profile could be added to the adjustment parameters, non-detection of which, during a read, would indicate a read error. An alternative embodiment uses an error detection code associated with the data in memory and calculates the error after each read. The adjustment parameters then have to be modified. If the read error is due only to imperfect initial adjustment, the choice of the modified values of these parameters can be made by testing successively: value corresponding to the most probable technology, then corresponding to a case intermediate between the most probable technology and the worst technology, then corresponding to a case intermediate between the most probable technology and the best technology, then to the case corresponding to the best technology, then to the case corresponding to the worst technology. Of course, these tests are stopped when the memory reading is error-free.

To ensure higher reliability read error detection, parameters are in the binary digital form, optimal values being associated with an error detection code which is also loaded into memory and, after reading of the memory, by an error detection operation being run by means of the error detection code.

Moreover, to converge as quickly as possible on correct reading of the memory, the process according to the invention is also characterized by said code being an error correcting code allowing at least a simple error to be corrected and, if a simple error is detected, by said modified value being the value read and corrected by means of said code.

The invention also relates to a synchronous system comprising several units synchronized by clock signals furnished by at least one generator from a basic clock signal. The generator has means for adjusting the clock signals, the adjustment means being controlled by digital adjustment parameters. The generator is associated with a nonvolatile memory containing the optimum values of the adjustment parameters corresponding to the technological characteristics of the circuits forming the generator and/or the units it synchronizes. The system comprises means for reading memory and transferring means connected to the read means to control the adjustment means as a function of the value read into said memory.

DESCRIPTION OF THE DRAWING

These and other features of the present invention will be better understood by reading the following detailed description of the invention, taken together with the drawing, wherein.

DETAILED DESCRIPTION

Figure 1:
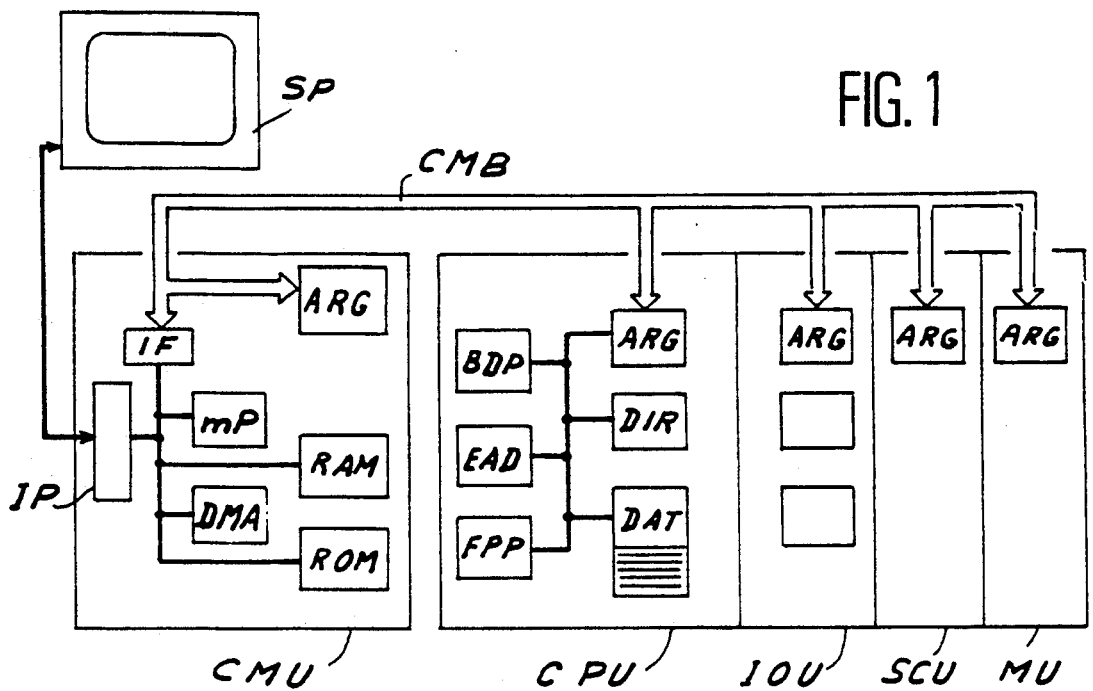
FIG. 1 represents a synchronous system according to the invention.

FIG. 1 represents schematically and as an application example the central subsystem of a data processing system composed of one or more processor cards CPU, one or more input-output cards IOU, a memory controller SCU, memory cards MU, and a maintenance card CMU. These units are associated with a service processor SP connected to the maintenance card CMU, itself connected to the other units through a maintenance bus CMB.

Each card, for example one of the processor cards CPU, has several functional units EDP, EAD, FPP, DIR, DAT each of which can be made in the form of an integrated circuit. All the units of all the cards function synchronously and communicate with each other via appropriate functional links (buses for example), not shown. The functional units of each card are synchronized by a clock signal generator ARG mounted on the card, whose function is controlled by the service processor through bus CMB.

According to one feature of the embodiment described, the maintenance card CMU has a primary or master clock generator (hereinafter called ARG-M) which services the secondary or slave clock generators and other master clock signal cards via specific links that are not shown.

Card CMU has a microprocessor system mP associated with a random access memory RAM, a read-only memory ROM, a direct access unit to the memory DMA, and interface circuits (IP, IF) with service processor SP and bus CMB, respectively.

Bus CMB is a microprocessor bus of the classic type with data, address, and control lines, as known in the art. This bus is connected to the functional units and to the clock generators of the cards in such a way as to control the maintenance operations at the system level, in particular to control initialization and adjustment of the clock signals The clock system operates as a whole as follows. On the initiative of service processor SP, microprocessor mP runs a specific microprogram having the result in particular of placing on bus CMB, through interface IF, control signals intended for the various clock generators ARG. The detailed operation of each clock generator will be explained with reference to FIG. 2.

Figure 2:
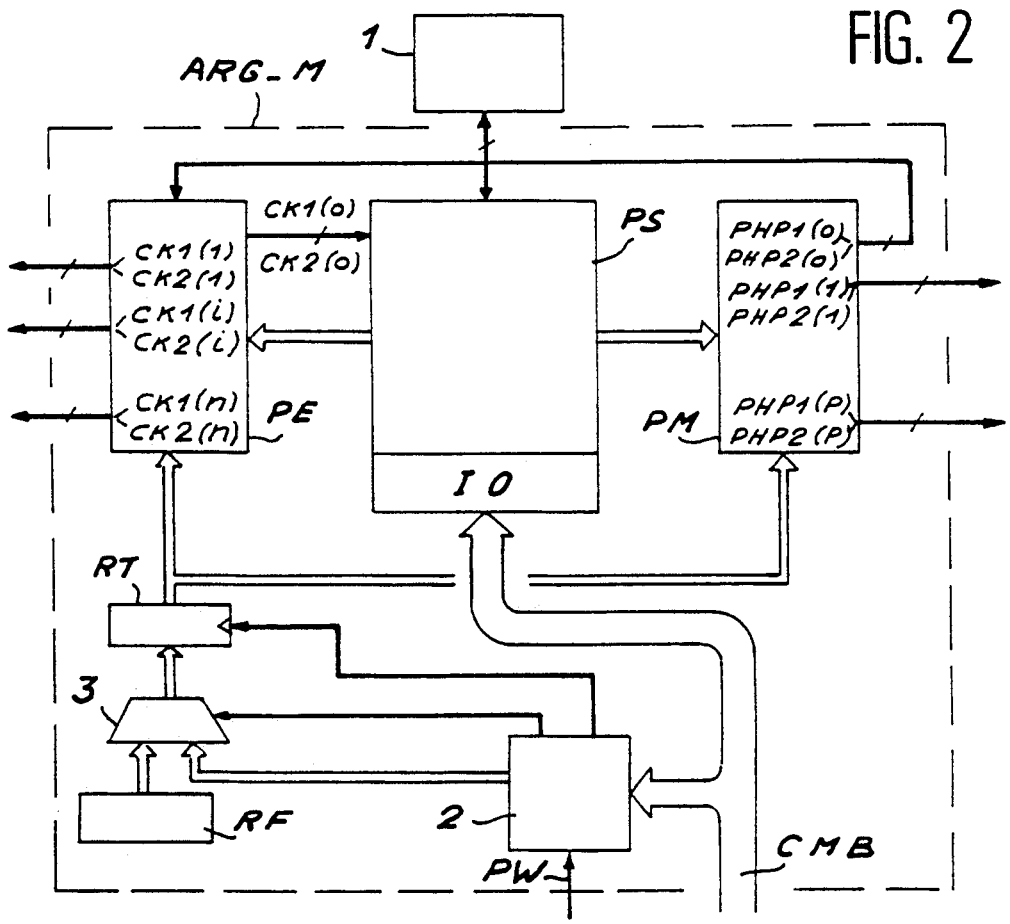
FIG. 2 represents a clock generator provided with adjustment means for implementation of the invention.

FIG. 2 represents clock generator ARG-M as well as a nonvolatile memory 1 of maintenance card CMU. The circuits of generator ARG-M can be subdivided into three main parts: a master part PM, a slave part PE, and a synchronous part PS. Master part PM, which has a quartz oscillator (not shown) furnishes master clock signals PHP1, PHP2, intended for the various system cards numbered 0, 1, . . . , p, with card CMU being numbered 0. The clock generators of the other units also have a synchronous part and a slave part receiving the master clock signals that are intended for them. From master clock signals PHP1, PHP2, each clock generator generates, by means of its slave part, secondary or slave clock signals CK1, CK2 intended for the various integrated circuits on the card. For example, signals PHP1(0), PHP2(0) are sent to slave part PE of generator ARG-M of card CMU. From these signals, PE furnishes slave clock signals CK1(0), CK2(0), . . . , CK1(i), CK2(i), ..., CK1(n), CK2(n) intended respectively for the integrated circuits numbered 0, ..., i, ..., n of the card in question, In particular, signals CK1(0), CK2(0) are transmitted to synchronous part PS of the generator.

Parts PM and PE will be described in detail with reference to FIGS. 4 to 8.

Figure 3:
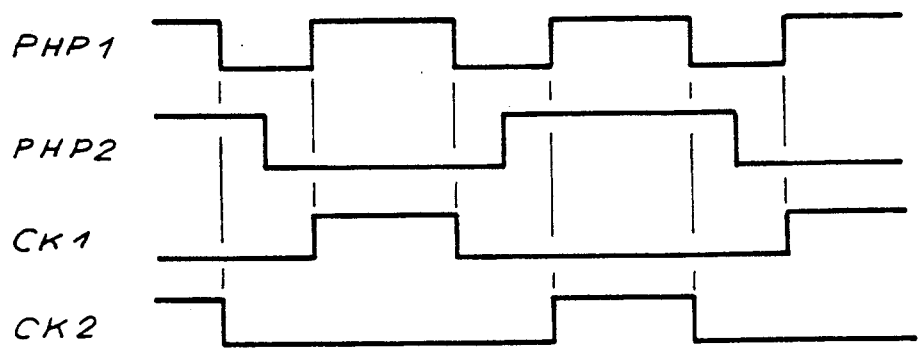
FIG. 3 represents different clock signals which can be adjusted according to the invention.

The waveforms of signals PHP1, PHP2, CK1, CK2 are shown in FIG. 3. Signal PHP1 has double the frequency of each of signals CK1 and CK2 while signal PHP2 is a discrimination signal for these two phases. This example, given purely for purposes of illustration, is in the context of two-phase operation (CK1, CK2), the master clock shown being chosen to increase the phase tolerance of signals PHP1 and PHP2 in view of the perturbations due to links between the master clock generator and the slave clock generators of the various cards.

Maintenance bus CMB is connected to synchronous part PS through interface circuits IO serving in particular for resynchronization of the signals exchanged between microprocessor mP and synchronous part PS since the microprocessor system is synchronized by a clock independent of that of the system to be adjusted.

Generator ARG-M has an adjustment register RT whose output is connected to the adjustment inputs of the master and slave parts PM, PE in order to furnish the respective adjustment values thereto. Adjustment register RT is commanded to write by a selection and writing circuit 2 connected at its input to maintenance bus CB. The input of adjustment register RT is connected to the output of a multiplexer 3 controlled by circuit 2. Multiplexer 3 has a first input connected to the data output of circuit 2 and a second input receiving a hardwired digital value RF. Value RF is an approximate value corresponding to the adjustment to be applied if the circuits of the generators and the units have the most probable characteristics of those that could be obtained by the manufacturing process or processes chosen to make these circuits. Circuit 2 finally receives a signal PW representing the powering up of the system.

Synchronous part PS has a read and writing interface connected to nonvolatile memory 1 by an appropriate link. Memory 1 can for example be made by means of an electrically erasable programmable memory (EEPROM). Advantageously, this memory is of the serial type in order to reduce the number of links between this memory and synchronous part PS.

Synchronous part PS also has circuits for decoding the addresses received from bus CMB as well as a data path comprising a set of command registers, memory banks, and automatic devices for performing certain maintenance operations, exhaustive description of which would be beyond the scope of the present invention. In addition to the read and write circuits of memory 1, part PS has circuits for transferring data between this memory and bus CMB. All these circuits are synchronized by clock signals CK1(0), CK2(0).

Select and write circuit 2 has a circuit to decode the commands and addresses received from bus CMB and circuits to generate, as a function of these signals and the power signal PW, signals for selecting multiplexer 3 and for controlling writing of adjustment register RT. Circuit 2 also has a circuit for transferring data from bus CMB to the input of multiplexer 3. Circuit 2 is an asynchronous logic circuit whose classic logic gate design can easily be deduced from the operations described below.

As already stated, the slave clock generators are distinguished from ARG-M by the absence (or non-use) of master part PM. Hence, only slave part PE of these generators is likely to undergo adjustment.

We will now describe the operation of generator ARG-M from the standpoint of clock adjustment. Of course, this operation also applies to the slave generators except where master part PM is concerned.

The system clock generators are adjusted in two phases: a preliminary phase in which the optimal values of the adjustment parameters are determined by placing each system card on a test bench, then an adjustment phase using these optimal values. This second phase being executed every time the system is powered up after its installation. In all cases, the operations are initialized by the service processor SP and executed under the control of corresponding microprograms in microprocessor system mP.

The first adjustment phase occurs as follows. Microprocessor mP controls circuit 2 through bus CMB so that through multiplexer 3 it authorizes transfer of data between bus CMB and adjustment register RT. According to a procedure determined in the SP, mP then sends a series of adjustment parameter values which are loaded sequentially into register RT until the clock signal characteristics match the reference characteristics. When a match is obtained, the optimum adjustment parameter value is then defined. mP then calculates the error detect and correct code (Hamming code for example) associated with this optimum value. Then, mP commands synchronous part PS to write the optimum value and its error code into memory 1.

When all the memories of the system cards have been loaded as before, the system can be installed and each time it is powered up the second phase runs as follows. Under the control of mP and power signal PW, circuit 2 transfers approximate value RF into register RT. Parts PM and PE then furnish approximate clock signals PHP1, PHP2, CK1, CK2. Synchronous part PS is then synchronized by approximate clock signals CK1(0), CK2(0). Under the control of mP, synchronous part PS then reads memory 1 and the value read is transmitted with its error code to microprocessor mP. The microprocessor mP then performs an error detection operation and if no error is detected, it commands circuit 2 to load this value into register RT. If mP detects one or more correctable errors by means of the code, it corrects and commands circuit 2 to load the correct value into register RT. The microprocessor mP then commands a new reading of memory 1 and checks the accuracy of the new value read. If mean value RF is too remote from the optimum value, the first reading of memory 1 will be too full of errors to be correctable. In this case, mP will execute an algorithm to search for an initial adjustment value leading to a reading that is at least correctable. According to this algorithm, mP first loads register RT with a mean value, then with a value corresponding to a case intermediate between the most probable technology and the worst technology, then corresponding to a case intermediate between the most probable technology and the best technology, then to the case corresponding to the best technology, then to the case corresponding to the worst technology. Normally, one of the foregoing tests will lead to a correct or correctable reading of the adjustment parameter values.

If the above method does not lead to success, it will indicate the presence of defects in the circuits used.

Figure 4:
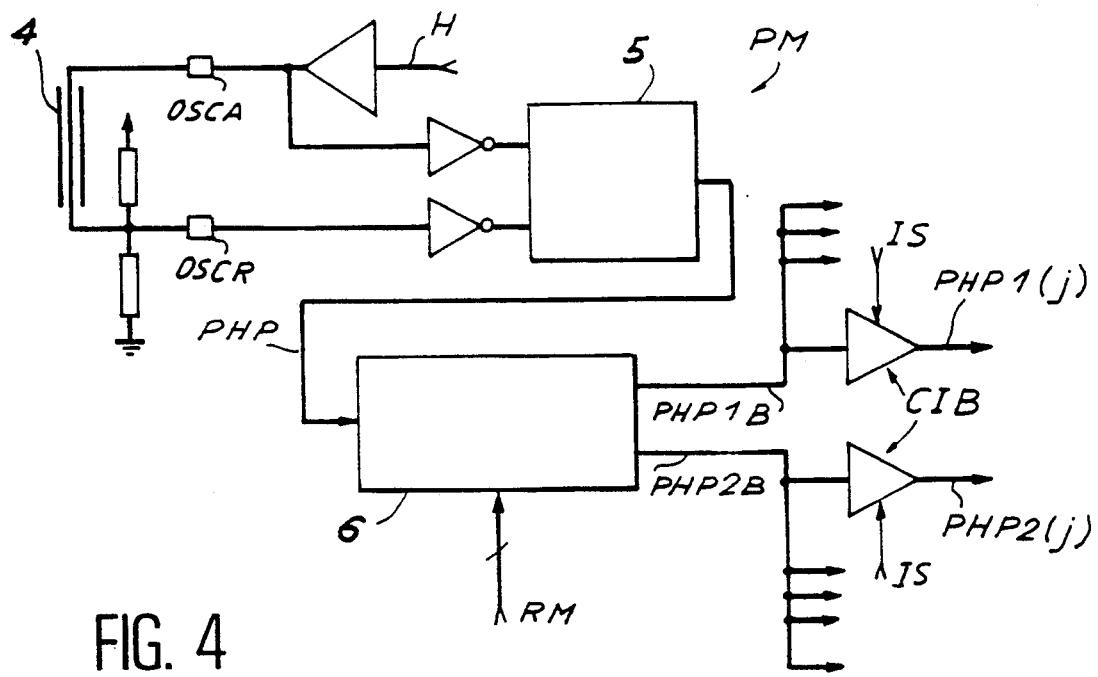
FIG. 4 represents the circuits generating and adjusting the clock signals of a primary clock generator.

FIG. 4 represents the master part PM of generator ARG-M of card CMU. This circuit receives a basic clock signal H furnished by a quartz oscillator. Signal H is transmitted after amplification to a first input of a shaping circuit 5 and to a second input of circuit 5 through a delay line 4. Line 4 which is associated with an adapting divider bridge is external to part PM when the latter is made in the form of an integrated circuit. The integrated circuit then has two terminals OSCA and OSCR to connect the delay line thereto. Shaping circuit 5 can be made by means of a circuit equivalent to a flip-flop RS which furnishes a signal PHP calibrated widthwise according to the characteristics of delay line 4. The shape of signal PHP is analogous to that of signal PHP1 shown in FIG. 3. Signal PHP is then applied to the input of a variable-delay circuit 6 furnishing a first output signal PHP1B identical to signal PHP and a second signal PHP2B obtained from signal PHP after processing in a bistable circuit followed by a delay circuit controlled by parameters RM. This delay circuit can be simply made of a chain of inverters arranged selectively in series as a function of command RM to obtain the desired phase shift between PHP1B and PHP2B. Each signal PHP1B or PHP2B is then applied to the inputs of amplifiers CIB whose impedance is adjustable according to an adjustment value IS. Each amplifier CIB is assigned to one system card. For example, two amplifiers furnish signals PHP1(j) and PHP2(j) intended for card j.

The operation of the circuit in FIG. 4 can easily be deduced from the diagram. It should however be pointed out that the arrangement offers the possibility of adjusting each amplifier CIB independently of the others to take into account differences in the characteristics of the circuits intended to receive the output signals from these amplifiers. In practice, for reasons of simplified adjustment and above all for reasons of test operations, one may merely apply the same adjustment IS to all the amplifiers. In this case, all that is in fact corrected is the manufacturing variations in the clock generator.

Figure 5:
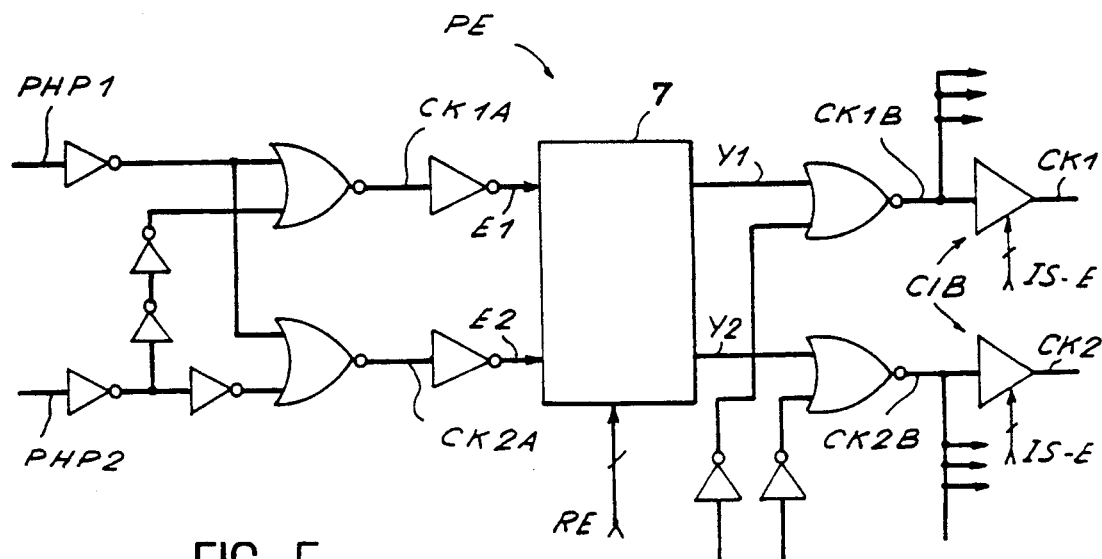
FIG. 5 represents a circuit generating and adjusting the clock signals of a secondary clock generator.

FIG. 5 represents the slave part PE of the generators. This circuit receives signals PHP1, PHP2 from corresponding amplifiers of the master generator. These signals are processed by a set of logic circuits furnishing signals CK1A and CK2A resulting respectively from logic operation AND between PHP1 and PHP2 and between PHP1 and the complement of PHP2. Signals CK1A and CK2B have the shapes of signals CK1 and CK2 in FIG. 3, respectively. Signals E1, E2 which are the reverse of CK1A, CK2A, respectively are then processed by a variable-delay circuit 7 delivering two delayed signals Y1, Y2 as a function of adjustment command RE.

Figure 8:
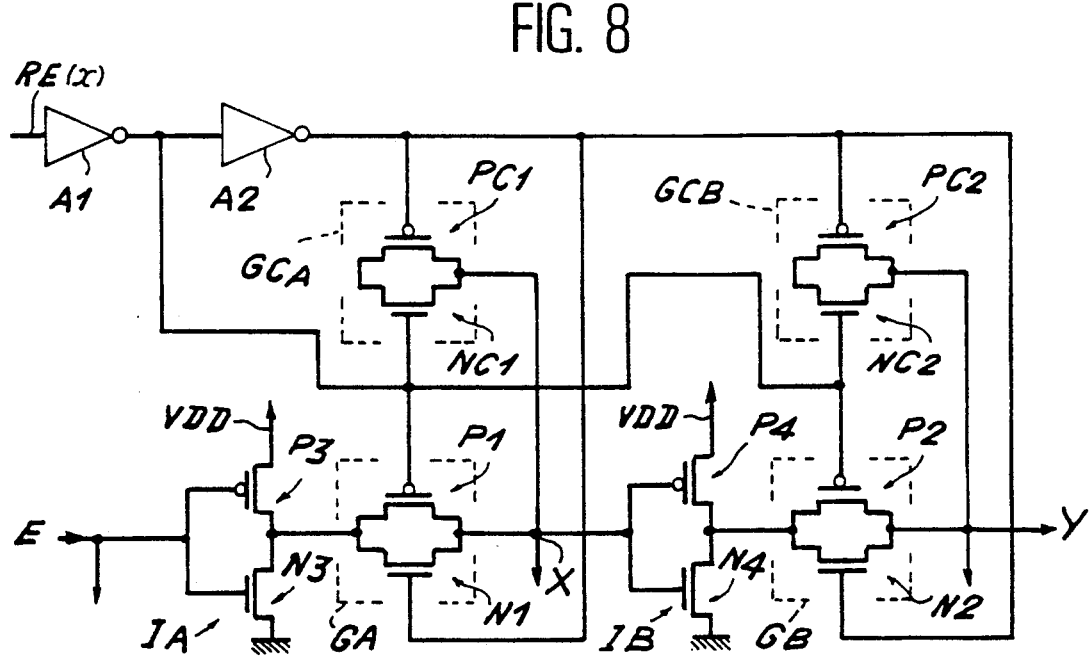
FIG. 8 represents one of the circuits of which an adjustabledelay circuit is composed.

The detailed design of circuit 7 will be provided with reference to FIG. 8. Signals Y1 and Y2 are each applied to the input of a NOR gate in order to furnish signals CK1B and CK2B identical to signals Y1 and Y2 when the NOR gates are validated by authorization signals applied to the second inputs of each of these gates. Signals CK1B and CK2B are then amplified by amplifiers CIB whose impedance is adjustable as a function of adjustment parameters IS-E to furnish adjusted clock signals CK1 and CK2.

Figure 6:
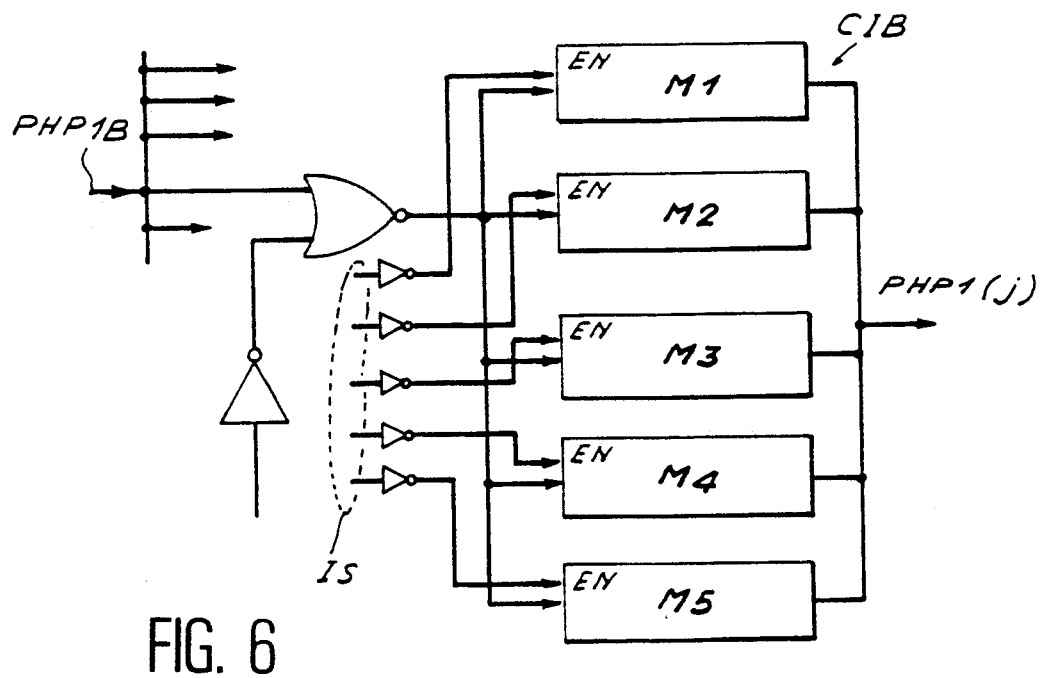
FIG. 6 represents an adjustable output amplifier.

FIG. 6 is the diagram of amplifiers CIB when they are applied to the primary generator. The amplifier comprises several modules M1, M2, ..., M5 connected in parallel and each receiving the clock signal to be adjusted, at its input (PHP1B in the case of the example shown), possibly after validation by means of a logic gate controlled by a validation signal. Each module M1 to M5 is in fact an amplifier with three states controlled by one of the bits of adjustment parameters IS and dimensioned such as to have a desired impedance.

Figure 7:
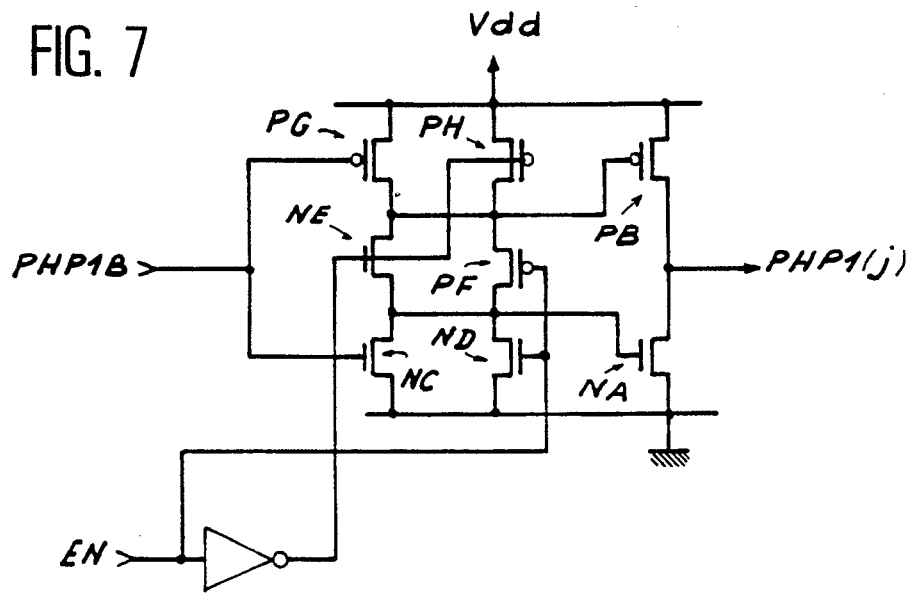
FIG. 7 represents a detail of the amplifier in FIG. 6.

One CMOS embodiment of these modules is shown in FIG. 7. It is composed of four n-channel transistors NA, ND, NC, NE and four p-channel transistors PB, PH, PG, PF. Transistors PG and NC are connected in series between positive voltage Vdd and ground through the drain-source lead of transistor NE and each receives input signal PHP1B at its gate. Transistors PB and NA are connected in series between Vdd and ground and their gates are connected respectively to common points, to PG and NE on the one hand and to NC and NE on the other hand. Finally, transistors PH, PF, and ND are respectively connected in parallel with transistors PG, NE, and NC. The gates of transistors PF and ND are connected together and constitute validation input EN of the module. EN is the input of an inverter whose output is connected to the gates of transistors NE and PH. The point common to PB and NA constitutes the output PHP1(j) of the amplifier.

The circuit of FIG. 7 operates as follows. When EN=1, transistors NE and PF are blocked while transistors PH and ND are conducting. As a result, PB and NA are blocked. Output PHP1(j) is then in the high-impedance state whatever the logic state of input PHP1B.

When EN=0, PH and ND are blocked and NE and PF are conducting. Thus, PG and NC on the one hand and PB and NA on the other hand constitute two inverters connected in cascade whose output PHP1(j) reproduces input PHP1B.

The output impedance of each module is determined by the resistance of the drain-source leads of transistors PB and NA which can be determined by dimensioning the width of these transistors. In the arrangement of FIG. 6, for example, the impedances of modules M1 to M5 could be dimensioned on a binary scale. Adjustment parameters IS will then be chosen such as to validate the modules whose connection in parallel presents the appropriate impedance.

Variable-delay circuit 7 can be made according to French Patent Application No. 9010579 filed on Aug. 23, 1990 and entitled "Circuit à constante de temps réglable et application à un circuit à retard réglable" ("Circuit with Adjustable Time Constant and Application to an Adjustable-Delay Circuit") which is hereby incorporated by reference. This circuit is made of a plurality of modules. As illustrated in FIG. 8, whose points E, X, and Y are connected with each other, E being one of the inputs E1 or E2 and Y being one of the outputs Y1 or Y2. Each module according to FIG. 8 is validated as a function of one of the bits RE(x) of adjustment word RE.

Although the invention has been shown and described with respect to an illustrative embodiment thereof, it should be appreciated by one of ordinary skill in the art that various changes, omissions and additions in the form and detail thereof may be made without departing from the spirit and scope of the invention as delineated in the claims.

What is claimed is:

1. A process for adjusting clock signals in a synchronous system having at least a first unit and a second unit synchronized by the clock signals, said process comprising the steps of:

determining optimum values of digital adjustment parameters to confer reference characteristics on said clock signals prior to starting said synchronous system;

storing said digital adjustment parameters in a nonvolatile memory coupled to a first clock signal generator having an adjustment means;

furnishing said clock signals by said first clock signal generator from a basic clock signal provided from a basic clock signal generator to said first clock signal generator;

adjusting said clock signals using said adjustment means;

controlling said adjustment means using said digital adjustment parameters retrieved from said nonvolatile memory;

reading said nonvolatile memory wherein the step of reading said nonvolatile memory is carried out by a read circuit synchronized by at least one clock signal and wherein said step of reading said nonvolatile memory further includes the step of:

(a) detecting the existence of read errors;

wherein in response to no read errors being detected in said detecting step, said adjustment means is controlled directly by said digital adjustment parameters stored in said nonvolatile memory;

wherein in response to read errors being detected in said detecting step, said adjustment means is controlled by a modified value of said digital adjustment parameters; and wherein a first reading of said nonvolatile memory is preceded by a step of controlling said adjustment means by an adjustment value having a value corresponding to an approximate value of said digital adjustment parameters.

2. The process according to claim 1 wherein:

said nonvolatile memory is dedicated to said first clock signal generator;

said digital adjustment parameters are provided in binary digital form;

said optimum values of said digital adjustment parameters are associated with an error detection code which is also loaded into said nonvolatile memory; and said step of detecting the existence of errors is carried out, after reading said nonvolatile memory, by using said error detection code.

3. The process according to claim 2 wherein:

said first clock signal generator is a first one of a plurality of clock signal generators, wherein each of said plurality of clock signal generators has coupled thereto a dedicated nonvolatile memory for storing digital adjustment parameters;

said error detection code includes an error correcting code allowing an error to be corrected; and said modified value, in the case of detection of said error, corresponds to a value read and corrected by means of said code.

4. The process according to claims 1, 2 or 3, wherein said modified value corresponds to a digital adjustment value applied in response to at least the following condition:

(a) said generator and said first unit and said second unit have manufacturing characteristics corresponding to the most probable manufacturing characteristics for a predetermined manufacturing process.

5. The process according to claim 2 wherein said adjustment parameters indicate to said adjustment means that amplitude correction is to be applied to said clock signals.

6. The process according to claim 2 wherein at least one of said digital adjustment parameters indicate to said adjustment means that phase correction is to be applied to said clock signals.

7. The process of claim 1 wherein the at least one clock signal for synchronizing the read circuit in the step of reading said nonvolatile memory corresponds to the clock signal to be adjusted.

8. A synchronous system comprising:

a plurality of units;

a basic clock signal generator for providing a basic clock signal;

at least one adjustable clock generator for receiving the basic clock signal and for providing at least one adjustable clock signal from the basic clock signal, each of said at least one adjustable clock generators comprising:

a clock signal adjustment circuit for adjusting said clock signals, said clock signal adjustment circuit being controlled by digital adjustment parameters; and a nonvolatile memory having stored therein prior to starting said synchronous system an optimum value of digital adjustment parameters corresponding to technological characteristics of circuits forming at least one of said adjustable clock generators and said plurality of units; and reading means for reading a read value from said nonvolatile memory; and transfer means connected to said reading means to control said clock signal adjustment circuit as a function of said read value read from said nonvolatile memory;

wherein said nonvolatile memory is dedicated to said adjustable clock generator;

wherein said reading means comprises a synchronous circuit synchronized by a clock signal; and wherein said transfer means allows said adjustment circuit to be controlled as a function of a first one of:

(a) a predetermined value of said digital adjustment parameters; and (b) said read value.

9. The synchronous system of claim 8 wherein the clock signal for synchronizing said synchronous circuit corresponds to the clock signal to be adjusted.

10. The synchronous system according to claim 8 wherein:

said digital adjustment parameters are associated with at least one of:

a detection code; and an error correction code; and said reading means comprises means for detecting and/or correcting errors that affect said digital adjustment parameters.

11. The synchronous system according to claim 8 or 10 wherein said clock signal adjustment circuit comprises:

a first adjustment circuit; and an adjustment register coupled to said first adjustment circuit wherein said adjustment register is provided for storing said digital adjustment parameters and an output of said adjustment register activates said first adjustment circuit.

12. The synchronous system according to claim 11 wherein said first adjustment circuit comprises at least a first one of:
 (a) an amplitude adjustment circuit for adjusting the amplitude of said clock signals; and
 (b) a phase adjustment circuit for adjusting the phase of said clock signals.

13. The synchronous system according to claim 12 wherein said reading means comprises:
 a microprocessor system;
 a first plurality of interface circuits coupled between said microprocessor and said synchronous circuit;
 a second plurality of interface circuits coupled between said microprocessor and said adjustment register; and
 wherein said synchronous circuit and said interface circuits are designed respectively to read said non-volatile memory and to write in said register under the control of said microprocessor.

14. The synchronous system according to claim 13 further comprising:
 a common interface coupled between said microprocessor and the clock signal adjustment circuit of each of the at least one master clock generators;
 a primary generator having a master part and a slave part; and
 a plurality of secondary generators having a slave part, said master part of said primary generator delivering to slave parts master clock signals from a basic clock, each of said slave parts of said generators delivering slave clock signals generated from said master clock signals.

15. The synchronous system according to claim 11 wherein said primary generator and said microprocessor are part of an electronic maintenance card, and each secondary generator is part of a system card, and circuits of each card are synchronized by said slave clock signals generated by said secondary generator associated with said card.

* * * * *

UNITED STATES PATENT AND TRADEMARK OFFICE
CERTIFICATE OF CORRECTION

PATENT NO. : 5,305,453
DATED : April 19, 1994
INVENTOR(S) : Jean-Marie Boudry et al It is certified that error appears in the above-indentified patent and that said Letters Patent is hereby corrected as shown below:

In the Abstract, line 4, "signal The" should read --signal. The--, (i.e., the period is missing between the sentences).

Column 4, line 4, "adjustabledelay" should read --adjustable-delay--.

Column 4, line 17, "EDP" should read --BDP--.

Column 12, line 16, "claim 11" should read --claim 14--.

Signed and Sealed this

Thirteenth Day of December, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,305,453
DATED : April 19, 1994
INVENTOR(S) : Jean-Marie Boudry, et. al.

It is certified that error appears in the above-indentified patent and that said Letters Patent is hereby corrected as shown below:

Title page, item [75], inventors: "Jacques Brinkuysen" should read as following: Jacques Brinkhuysen Signed and Sealed this Nineteenth Day of October, 1999

Attest:

Q. TODD DICKINSON

Attesting Officer

Acting Commissioner of Patents and Trademarks